United States Patent [19]
Arrowsmith et al.

[11] Patent Number: 5,188,204
[45] Date of Patent: Feb. 23, 1993

[54] PRE-FILLED POWER HYDRAULIC SYSTEM

[75] Inventors: David R. Arrowsmith, Leamington; David Parsons; Alastair J. Young, both of Kenilworth, all of United Kingdom

[73] Assignee: Automotive Products plc, England

[21] Appl. No.: 753,148

[22] PCT Filed: Feb. 1, 1989

[86] PCT No.: PCT/GB89/00092
§ 371 Date: Sep. 13, 1990
§ 102(e) Date: Sep. 13, 1990

[87] PCT Pub. No.: WO89/08786
PCT Pub. Date: Sep. 21, 1989

[30] Foreign Application Priority Data

Mar. 17, 1988 [GB] United Kingdom ............... 8806292

[51] Int. Cl.$^5$ ................ F15B 21/00; F16D 25/12; B60K 17/10
[52] U.S. Cl. ...................... 192/3.58; 60/415; 60/586; 192/85 CA
[58] Field of Search ............... 60/585–589, 60/533, 413, 415, 583; 91/432; 192/3.62, 3.58, 0.052; 285/3; 92/92

[56] References Cited

U.S. PATENT DOCUMENTS

| | | |
|---|---|---|
| 3,061,058 | 10/1962 | Barth ............................ 192/3.58 |
| 3,861,144 | 1/1975 | Woods .......................... 60/413 X |
| 3,918,497 | 11/1975 | Schön ............................ 92/92 X |
| 3,985,063 | 10/1976 | Lemon ......................... 60/413 X |
| 4,181,016 | 1/1980 | Schapink ....................... 244/114 |
| 4,599,860 | 7/1986 | Parsons ........................ 60/586 X |
| 4,732,642 | 2/1988 | Grunberg et al. ............. 192/3.62 X |
| 4,854,433 | 8/1989 | Tellert ........................ 192/0.052 X |
| 4,959,957 | 10/1990 | Schmale et al. ................ 60/413 |
| 4,959,960 | 10/1990 | LaFountain .................... 60/585 X |
| 4,979,366 | 12/1990 | Compton et al. ............. 192/85 CA |
| 4,987,740 | 1/1991 | Coleman ......................... 60/583 |
| 5,002,166 | 3/1991 | Leigh-Monstevens et al. ... 192/3.62 X |
| 5,016,739 | 5/1991 | Im .............................. 192/0.08 |
| 5,040,653 | 8/1991 | Vukovich et al. ............. 60/413 X |
| 5,083,433 | 1/1992 | Leigh-Monstevens ........... 60/585 |

FOREIGN PATENT DOCUMENTS

| | | |
|---|---|---|
| 0238368 | 9/1987 | European Pat. Off. . |
| 651565 | 4/1951 | United Kingdom . |
| 822164 | 10/1959 | United Kingdom . |
| 951102 | 3/1964 | United Kingdom . |
| 1459419 | 12/1976 | United Kingdom . |

*Primary Examiner*—Leslie A. Braun
*Assistant Examiner*—Khoi Q. Ta
*Attorney, Agent, or Firm*—Davis, Bujold & Streck

[57] ABSTRACT

A motor vehicle has a manually operated change speed gearbox driven by an internal combustion engine through a clutch which is automatically disengageable and re-engageable by operation of a power hydraulic clutch control. The hydraulic control comprises a fluid reservoir connected by a conduit to a control valve connected to the reservoir by a conduit which includes a pump and a one-way valve and a pressure accumulator and a piston and cylinder or fluid pressure operated actuator connected by piping to the control valve. The clutch is operated by the actuator causing disengagement of the clutch when the control valve is operated to relieve fluid pressure in the actuator. The hydraulic control is assembled and filled with hydraulic fluid at some place which can be distant from the vehicle manufacturer's production line. The filled control is transported to where the vehicle is being made and the control is installed in the vehicle; possibly after the filled control has been stored first.

9 Claims, 4 Drawing Sheets

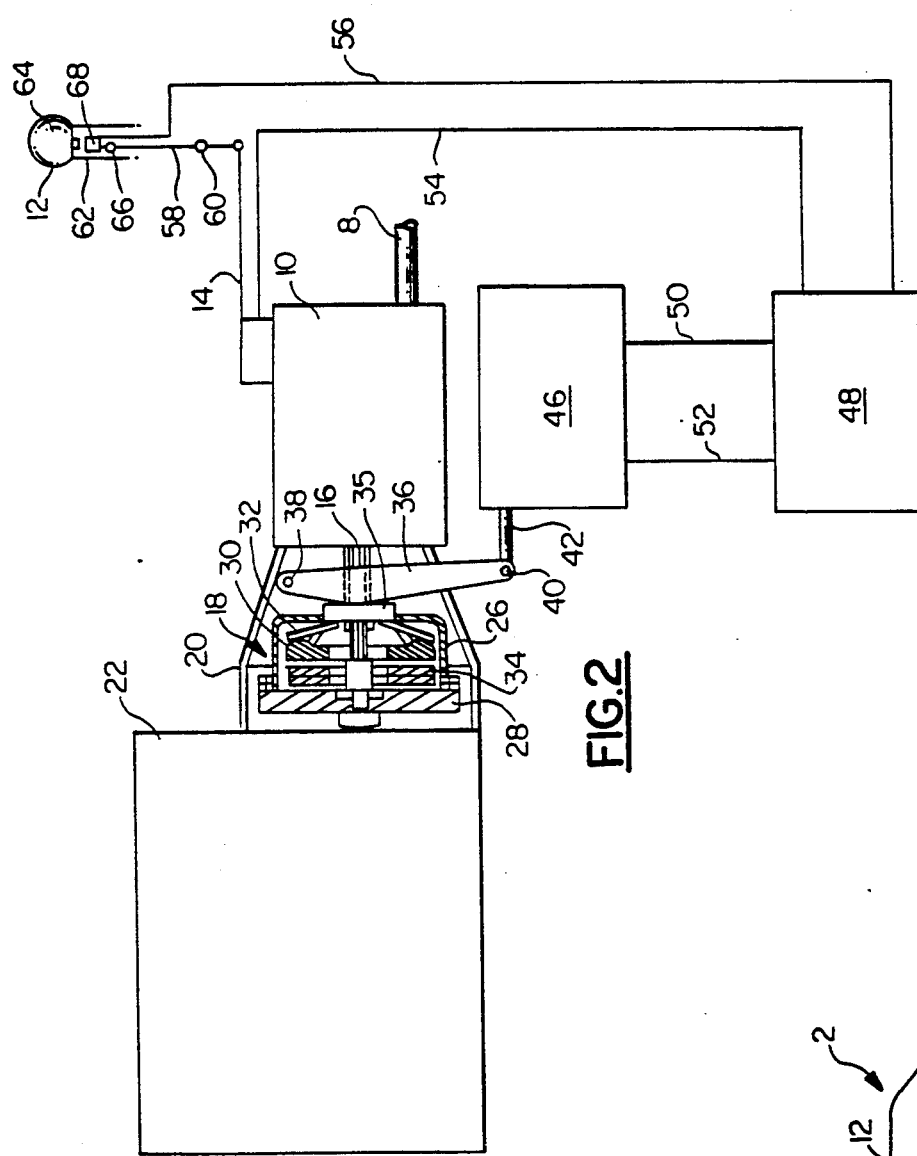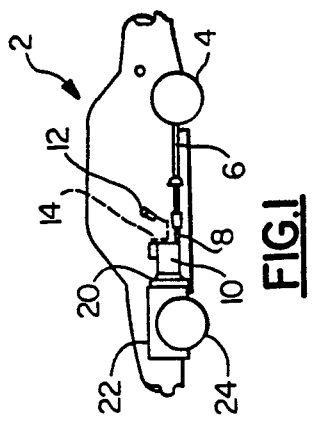

PRE-FILLED POWER HYDRAULIC SYSTEM

This invention relates to a power hydraulic system.

The power hydraulic system is of the type (hereinafter called "the type referred to") comprising a reservoir of hydraulic fluid, a control valve, conduit means connecting the reservoir with the control valve whereby hydraulic fluid may be supplied to the valve and returned therefrom to the reservoir, and said conduit means including therein a pump and an accumulator for the storing therein of hydraulic fluid under pressure delivered by the pump from the reservoir and for the supply of hydraulic fluid from said accumulator to the control valve.

In a power hydraulic system of the type referred to the control valve has service porting which can be connected by piping to an actuator operated by hydraulic pressure applied to said actuator, and the control valve has at least first and second states such that the valve in said first state connects the actuator to the supply of hydraulic fluid under pressure and in the second state the valve connects the actuator to the reservoir whereby hydraulic fluid can be returned to the reservoir from the actuator.

A semi-automatic transmission for a motor vehicle is known for driving at least one ground running wheel of the vehicle, using rotary output from an engine of the vehicle, the semi-automatic transmision being of the kind (hereinafter called "the kind referred to") comprising a change-speed gearbox having a rotary output shaft for supplying rotary motion to said ground running wheel and a rotary input shaft for receiving input torque from the engine and a plurality of gear ratios between said shafts each gear ratio being engageable and disengageable in response to operation of gear ratio selector means in response to manual action of a driver of the vehicle, clutch means engageable for transmitting torque to said input shaft from the engine and disengageable to interrupt the transmission of said torque to the input shaft, and clutch control means responsive to a first signal indicative of a wish by the driver to disengage the currently engaged said gear ratio and responsive to a second signal indicative that another said gear ratio has been engaged, and said clutch control means responding to said first signal to cause the clutch means to disengage and responding to said second signal to cause the clutch means to re-engage.

In a known semi-automatic transmission of the kind referred to the clutch control means comprises a power hydraulic system of the type referred to in which the control valve is connected by said piping to the actuator so that on occurrence of said first signal the control valve goes to said first condition and the actuator receives hydraulic fluid under pressure so that the actuator operates to cause disengagement of the clutch means, and on occurrence of said second signal the control valve goes to said second condition permitting return of hydraulic fluid to the reservoir from the actuator in which latter the hydraulic pressure drops to cause a re-engagement of the clutch means.

The actuator may be a piston and cylinder unit.

When building a vehicle comprising a semi-automatic transmission of the kind referred to the hydraulic clutch control means comprising the combination of said power hydraulic system of the type referred to and the piping and actuator is mounted in the vehicle on the production line, for example by installing the power hydraulic system and the actuator, and connecting to them the piping. Then the combination is filled with hydraulic fluid. This may be done by connecting a vacuum source to the combination to remove the air and then connecting the evacuated combination to a supply of hydraulic fluid to fill the combination with the fluid. This manner of providing the said combination has disadvantages. Firstly it requires reliable simultaneous supplies to the production line of the various component parts of the combination to be connected together on the line. Secondly the connecting together of those component parts on the line can be time consuming and increase the time it takes to manufacture the vehicle on the production line. Thirdly the filling of the combination with hydraulic fluid on the production line also extends the production time on the line. Fourthly should the assembled and filled combination be defective, the reason for this can be the subject of dispute between the supplier of the constituent parts of the hydraulic clutch control means and the vehicle manufacturer.

According to a first aspect of the invention a power hydraulic system of the type referred to and intended to be mounted in a motor vehicle is characterised in that the said system is assembled and filled with hydraulic fluid which is retained within the system during subsequent transportation and/or storage prior to the filled system being mounted in the vehicle.

According to a second aspect of the invention a power hydraulic system formed according to the first aspect is provided in combination with an hydraulic actuator and piping for conveying hydraulic fluid between the actuator and service porting of the control valve, and said piping and actuator are filled with hydraulic fluid which is retained therein during subsequent transportation and/or storage prior to the filled piping and actuator being mounted in the vehicle.

According to a third aspect of the invention the combination according to the second aspect is connected together and filled with hydraulic fluid which is retained in the combination during subsequent transportation and/or storage prior to the filled piping and actuator being mounted on the vehicle.

According to a fourth aspect of the invention there is provided a motor vehicle having a semi-automatic transmission of the kind referred to wherein the hydraulic clutch control means comprises the combination provided according to the second or third aspects of the invention.

The combination according to the third aspect of the invention avoids or considerably mitigates the aforesaid disadvantages at least some of which can be avoided or at least mitigated by arrangement in accordance with the first or second aspect .

The invention will now be further described, by way of example, with reference to the accompanying drawings in which:

FIG. 1 is a diagrammatic illustration of a motor vehicle formed according to the fourth aspect of the invention;

FIG. 2 is a diagrammatic representation of the semi-automatic transmission of the vehicle in FIG. 1;

Figure 3:
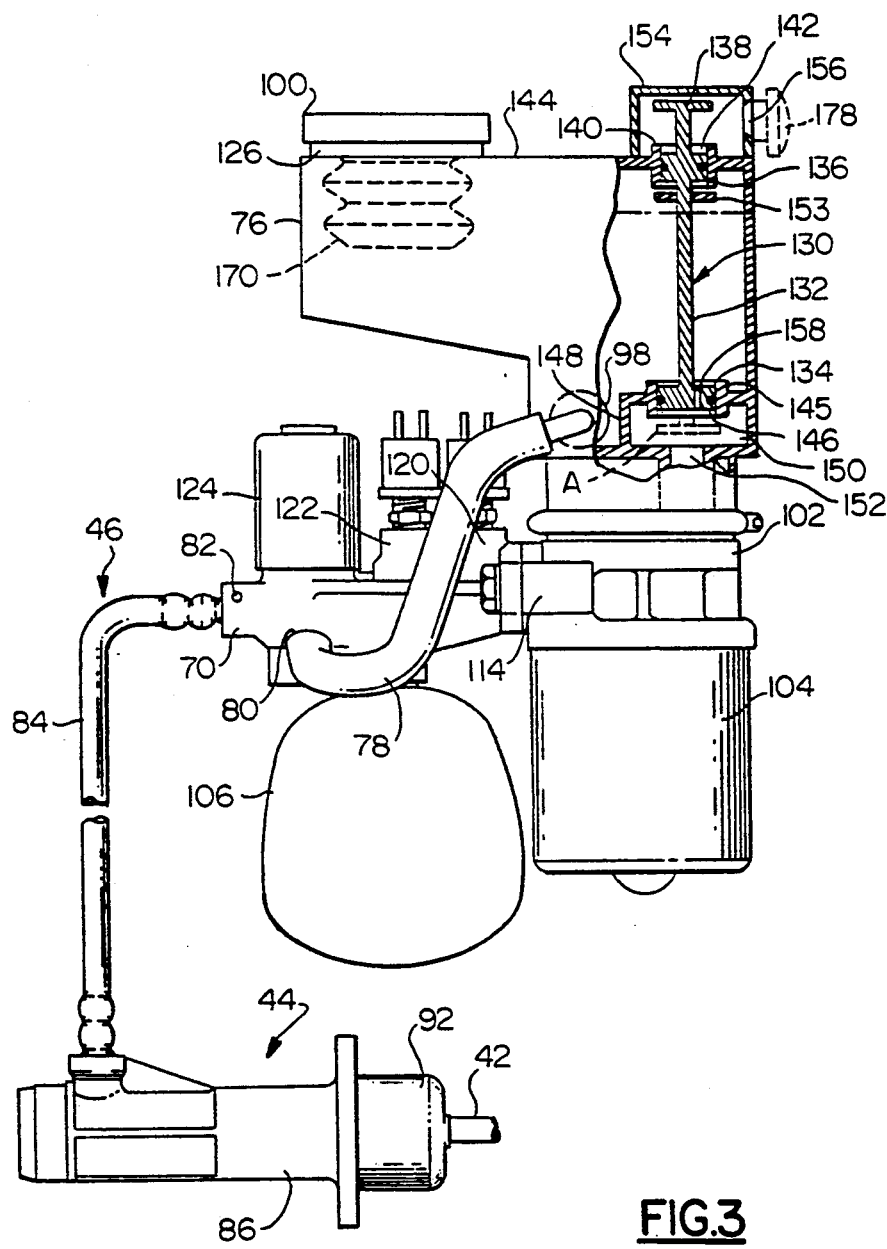
FIG. 3 is an elevation, fragmented and shown partly in section, of a power hydraulic system formed according to the first aspect of the invention in a combination formed according to the second or third aspect providing an hydraulic clutch control for the semi-automatic transmission in FIG. 2.
Figure 4:
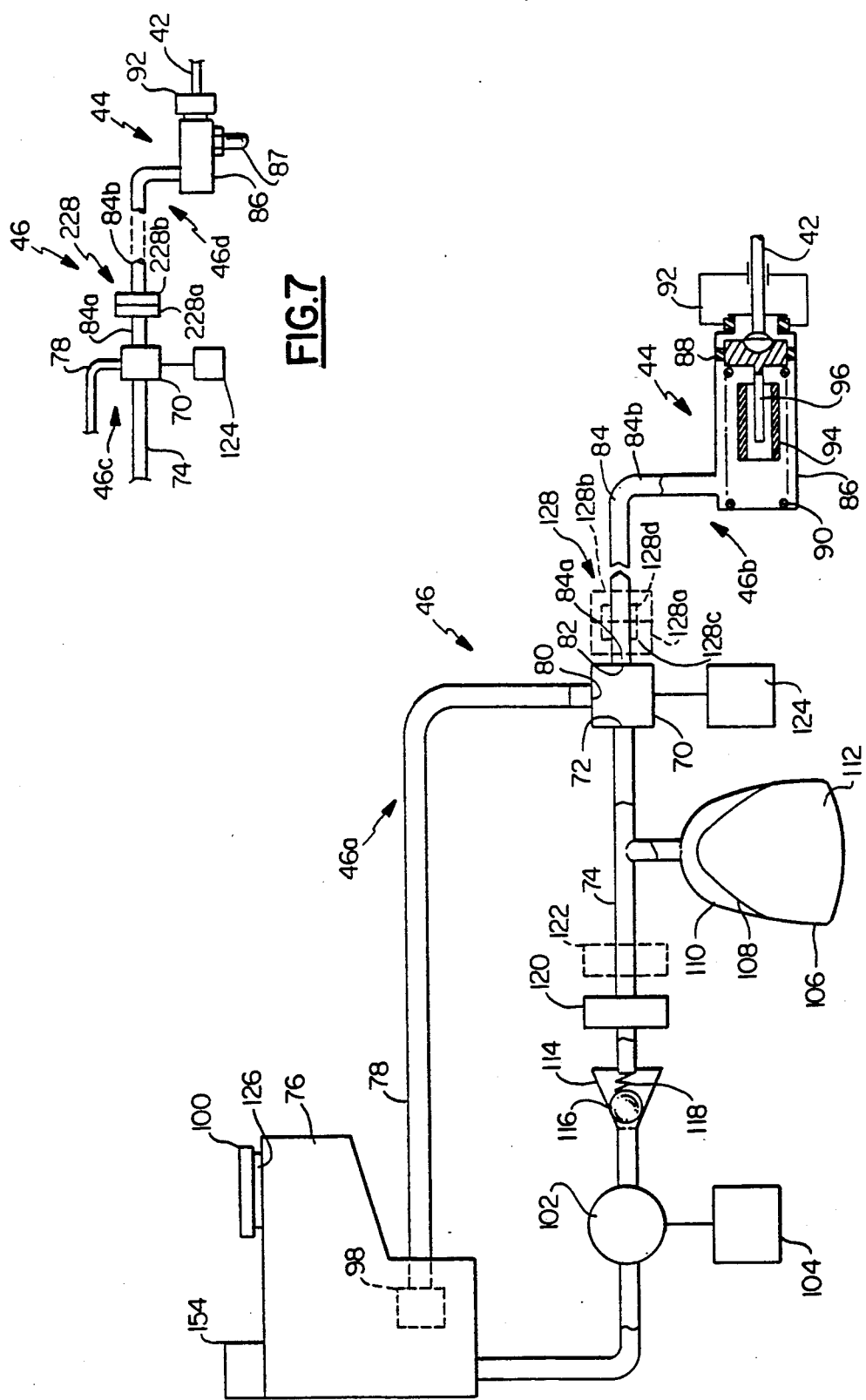
Figure 5:
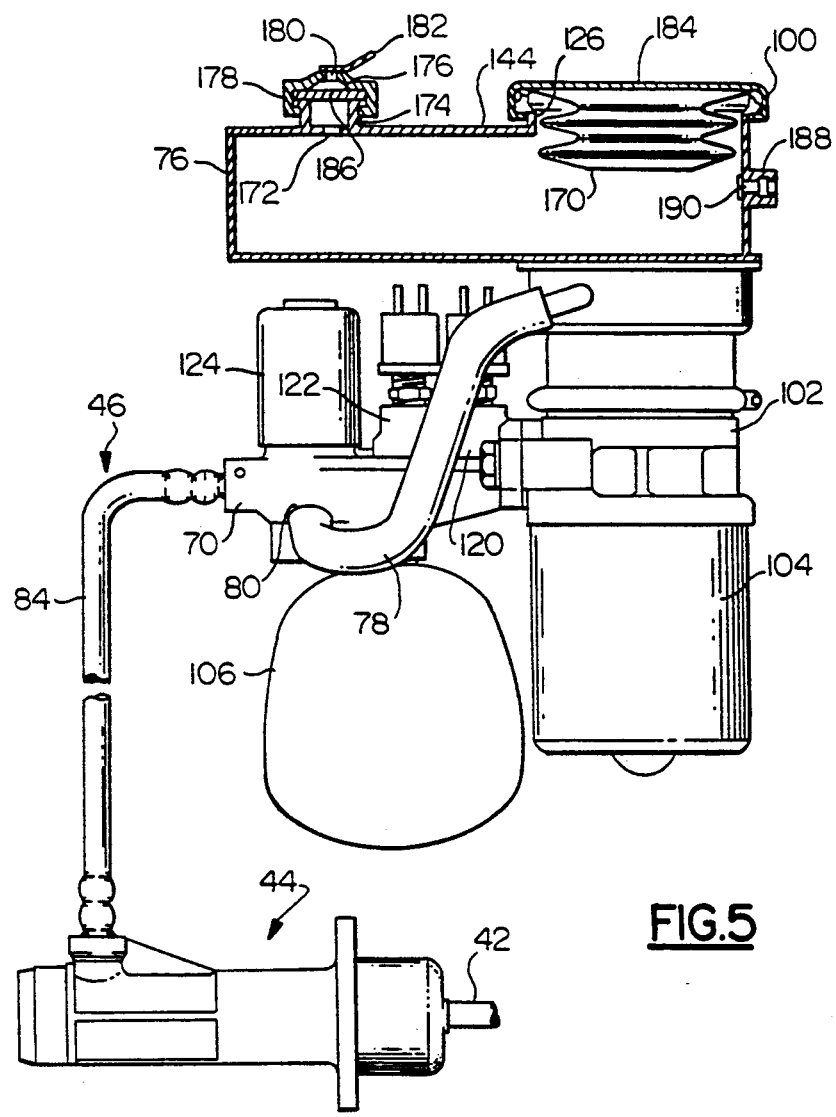
Figure 6:
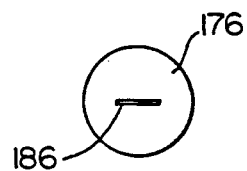

FIG. 4 diagrammatically represents the arrangement in FIG. 3;

FIG. 5 is an elevation, fragmented and partly in section, of another embodiment of a power hydraulic system formed according to the first aspect of the invention in a combination formed according to the second or third aspect providing an hydraulic clutch control for the semi-automatic transmission in FIG. 2, FIG. 6 is a plan view of a two-way valve used in the arrangement in FIG. 5, and FIG. 7 diametrically represents a fragment of a modification of the arrangement in FIGS. 3 & 4.

In the drawings the same reference numerals indicate like or comparable parts.

FIG. 1 shows a motor vehicle 2 having rear road wheels 4 driven via a propellor shaft 6 connected with an output shaft 8 of a change-speed gearbox 10 in which a plurality of gear ratios are each respectively engaged, or disengaged in response to manual operation, by the vehicle's driver, of a gear ratio selector device 12, in this example in the form of a gear lever, from which signals, in this example in the form of movement, are transmitted via a connection or linkage 14 to gear ratio change means (known per se) in the gearbox. On the other hand any other form of manually operable gear selector device may be used from which gear ratio disengage and engage signals can be transmitted to gear ratio change means in the gearbox. With reference also to FIG. 2, driving torque is input to the gearbox 10 through an input shaft 16 driven via a clutch 18, in a housing 20, by an internal combustion engine 22. As an alternative the transmission 10, 18 may drive front road wheels 24 or the front and rear road wheels 24 and 4. Turning to FIG. 2, the clutch 18 in this example is a push-type diaphragm spring clutch known per se having a cover 26 secured to a fly-wheel or other counter pressure plate 28 rotated by the engine 22. The clutch includes a pressure plate 30 acted on by diaphragm spring 32 and a driven plate 34 with an internally splined central hub engaging splines on the gearbox input shaft 16. The clutch also has release bearing 35 acted on by a release fork or lever 36 pivoted at 38 and also at 40 to a thrust rod 42 of an hydraulic actuator 44 (see FIGS. 3 and 4) in an hydraulic control 46. Operation of the hydraulic control 46 is under control of an electronic control 48 comprising computer means connected by signal paths 50 and 52 to the hydraulic control. One path 50 instructs operation of the hydraulic control 46 to cause disengagements and re-engagements of the clutch 18, and the other path supplies electonic control 48 with information on the extent of clutch engagement and disengagement. Electronic control 48 is also connected by two signal paths 54 and 56 to the gearbox 10 and the gear lever 12 respectively. The information in the signal on line 54 indicates when a gear ratio is engaged and when no gear ratio is engaged. Information in the signal on line 56 indicates when the driver desires or does not desire to change gear. Gear lever 12 comprises a shaft 58 arranged to pivot universally at 60. A tube 62 surmounted by a hand knob 64 is pivotably mounted at 66 on the shaft 58 so that the tube can wobble or rock slightly relatively to the shaft. Such wobbles caused by the driver grasping the knob 64 causes switch or transducer means 68 to initiate a signal on line 56 indicating the driver's wish to change gear. In response the controls 48 and 46 function causing clutch 18 to disengage automatically. Further manual movement of the knob 64 causes the shaft 58 to move to cause operation of the gear ratio change means to cause disengagement of the hitherto engaged gear ratio and the engagement of another gear ratio. That engagement produces a signal on line 54 causing the controls 48 and 46 to function so that the clutch 18 is re-engaged automatically.

With reference to FIGS. 3 and 4, the hydraulic control 46 comprises a control valve 70 having an inlet port 72 connected by a conduit 74 to an hydraulic fluid reservoir 76 of plastics which is connected by another conduit 78 to another port 80 of the control valve. That valve also has a service port 82 connected by piping 84, which may be flexible, to the actuator 44 formed by a cylinder 86 in which slides a piston 88 acted on by spring 90 and acting on the thrust rod 42 sliding in a sealing boot 92. The actuator 44 also includes a position sensor (in the form of a transducer) to provide the signal on line 52 (FIG. 2) and comprising an electrical inductance coil 94 containing a sliding ferro-magnetic core 96 on the piston.

Conduit 78 opens out to the interior of the reservoir 76 through a filter 98. Other filter means (not shown) may be provided between the reservoir interior and the inlet to conduit 74. The reservoir has a filler cap 100.

Conduit 74 includes a pump 102 driven by an electric motor 104 integral therewith and an accumulator 106 known per se comprising a sturdy vessel internally divided by a tough, flexible, resilient membrane 108 into the chamber 110 for hydraulic fluid and chamber 112 containing gas under high pressure. The conduit 74 also includes a one-way valve 114 comprising a ball 116 urged by spring 118. The conduit also includes at least one pressure transducer 120 signalling via line 52 (FIG. 2), which may be a data bus, the fluid pressure prevailing in the chamber 110 so that the electronic control 48 (FIG. 2) operates the motor 104 (when the vehicle ignition system is switched on) to drive the pump 102 to raise hydraulic pressure in chamber 110 when that pressure is lower than a predetermined minimum but stops the motor to halt pumping when the pressure in chamber 110 attains a pre-determined maximum. On the other hand there may be two pressure transducers 120 and 122 arranged to observe or detect attainment of said minimum and maximum pressure values respectively.

The control valve 70 can be a sliding spool valve actuated by an integral electric motor 124 in the form of a solenoid actuator when the solenoid 124 is energised, in response to a signal on line 50 (FIG. 2), the control valve 70 adopts a first condition closing off the port 80 and connecting the inlet port 72 with the service port 82 so that hydraulic fluid under pressure from the accumulator 106 is applied to the actuator 44 to disengage the clutch 18 (FIG. 2). When the solenoid 124 is de-energised, either in response to signals from the control 48 or if the ignition is switched off, the control valve 70 adopts a second condition closing off port 72 and connecting the service port 82 with the outlet port 80 whereby hydraulic fluid from the actuator 44 can return to the reservoir 76 via the conduit 78 as the clutch 18 (FIG. 2) re-engages under the effect of the resiling diaphragm spring 32 which acts to push the piston 88 to the left in FIG. 4.

Initially the power hydraulic control 46 described and shown in FIGS. 3 and 4 is formed as a complete module in which the control valve 70 is permanently connected to the reservoir 76 and to the actuator 44 by the conduit 74 and 78 and the piping 84 at an assembly station in a workshop. The assembled control 46 can then be transferred to a filling station in the workshop where the filler cap 100 can be removed from the filler neck 126 which is then connected to a hose selectively connectable to either a source of vacuum or to a supply of hydraulic fluid. With the solenoid 124 de-energised the port 82 is connected to the port 80 and firstly vacuum is applied to evacuate the combination comprising the reservoir 76, pump 102, chamber 110, cylinder 86 and conduits and piping 74, 78 and 84. Then the supply of hydraulic fluid is turned on and the combination is filled with fluid to the extent desired. During filling the control valve 70 can continue to connect the ports 80 and 82, or the solenoid 124 may be energised to connect ports 72 and 82. Immediately after filling, the capacity of the chamber 110 may be substantially its normal minimum capacity.

Alternatively the hydraulic control 46 can be provided with sealable bleed ports or nipples which are initially opened to allow hydraulic fluid introduced through the neck 126 to fill the control. Whereafter the bleed ports are closed.

During filling of the control 46 with hydraulic fluid, the piston 88 may be held in any desired position in the cylinder 86. For example, if the piston 88 is held in FIG. 4 at its furthest travel to the right the cylinder 86 has maximum capacity. Then after filling, the piston 88 can be moved to the left in FIG. 4 to displace excess fluid from the reservoir 76 through neck 126.

After filling, the cap 100 is replaced The filled control 46 may be taken to a testing station in the workshop where the pump 102 can be operated and the control valve 70 actuated to simulate clutch engagement and dis-engagement, and the operation of transducers 120 and 122 and 94, 96 checked and the whole examined for leaks. Thereafter the filled control 46 can be stored ready for supply to a vehicle manufacturer or transported to the vehicle manufacturer's premises ready for installation in the pre-filled state in a vehicle.

In a modification the piping 84 can be divided into two portions 84a and 84b each provided with a respective coupling part 128a and 128b connectable together to form the coupling 128 known per se. Each coupling part 128a, 128b includes a coupling valve 128c, 128d, respectively automatically closeable to seal off the piping portions 84a and 84b when the coupling parts are disconnected. When the coupling parts 128a and 128b are connected this act applies pressure to the valves therein opening them to communicate pipe portion 84a with pipe portion 84b.

When a said coupling part 128a is not connected to a said coupling part 128b the hydraulic control 46 is divided into two hydraulic control parts 46a and 46b. The hydraulic control part 46a comprises the reservoir 76, the conduits 74 and 78, the control valve 70, the piping portion 84a, and the coupling part 128a. The hydraulic control part 46b comprises the coupling part 128b, the piping portions 84a, and the hydraulic actuator 44.

With the hydraulic control parts 46a and 46b disconnected one from the other when their coupling parts 128a and 128b are separated, it is possible to fill the control part 46a with hydraulic fluid via the filler neck 126. It is also possible to fill the actuator 44 and the piping portion 84b of the control part 46b with hydraulic fluid through the coupling part 128b after applying valve opening pressure to open its valve so that vacuum can first be applied to evacuate the interior of the control part 46b via the coupling part 128b and then the evacuated control part 46b is filled with hydraulic fluid; thereafter the valve opening pressure is released to allow the coupling part 128b to seal off the piping portion 84b.

A filled hydrdaulic control part 46a and a filled hydraulic control part 46b can be connected together at any time to form a pre-filled complete hydraulic control 46. For example the coupling part 128a of a filled control part 46a can be connected to a coupling part 128b of a filled control part 46b, for example at the vehicle manufacturer's premises, for example as the hydraulic control 46 is being installed in a vehicle.

One or more control parts 46a can be filled, stored or transported seperately from any control part 46b. Thus any filled control part 46a can eventually be connected to any filled control part 46b. This can be the case even if a control part 46a and a control part 46b are connected together by their coupling 128 to form a control 46 which is then pre-filled with hydraulic fluid and thereafter the coupling parts 128a and 128b disconnected so that, if desired, the filled control part 46a can be subsequently connected to a different filled control part 46b and vice - versa.

In the modification in FIG. 7, the complete hydraulic control part 46 comprises two hydraulic control parts 46c and 46d connected together by a fluid-tight coupling 228 formed by two connectable coupling parts 228a and 228b each mounted on an end of a respective piping part 84a or 84b. Initially the control parts 46c and 46d are separate due to the coupling parts 228a and 228b not being connected together. To seal off the ends of the piping parts 84a and 84b at the coupling parts 228a and 228b each coupling part is formed with an intact but breakable fluid-tight seal, for example a rupturable membrane. The control part 46c can be filled with hydraulic fluid in like manner to the control part 46a as described above. In the control part 46d, the actuator 44 is provided with an openable and closable valve or nipple 87 which can be connected to a hose selectively connectable to either a source of vacuum or to a supply of hydraulic fluid. With the nipple 87 open the hydraulic control part 46d is evacuated and then filled with hydraulic fluid, and then the nipple is closed and disconnected from the hose.

A filled hydraulic control part 46c can be stored and/or transported separately from a filled hydraulic control part 46d. The coupling parts 228a and 228b are so arranged that when they are connected together, the act of connection causes breakage of the seals in the coupling parts thus allowing communication between the piping parts 84a and 84b. This connection can be accomplished at any location, for example the vehicle manufacturer's premises, between any filled control part 46c and any filled control part 46d. The connection of the coupling parts 228a and 228b can be permanent in the sense that they are at least difficult to inadvertently disconnect.

A problem of leakage of hydraulic fluid might arise during handling, storing and transporting the pre-filled hydraulic control 46 on its own (or the pre-filled control part 46a or 46c) if the reservoir 76 is not effectively sealed. And yet an air vent in the reservoir or in the cap is desirable to allow escape of gas from the reservoir to prevent a build up of gas pressure therein. Such gas can reach the reservoir 76 for example via the conduit 78 from the control valve 70, after seeping passed the membrane 108 from the accumulator chamber 112. One way to avoid leakage of hydraulic fluid through the vent is to provide the latter with a removable fluid tight seal or cover which is manually removed at the time of installing the hydraulic control 46 in a vehicle.

Unfortunately it is possible to forget to remove a manually removable seal. To avoid this an automatically displaceable seal 130 is provided. The seal 130 comprises a generally upright spindle 132 having two spaced pistons 134 and 136 fast therewith and a handle 138 at one end. As shown in FIG. 3, the piston 136 can make a fluid tight seal with a cylindrical wall 140 of a passage 142 through an upper wall 144 of the reservoir 76. Simultaneously the lower piston 134 makes a fluid tight seal with a cylindrical wall 145 of a passage 146 through an internal partition 148 in the reservoir 76. I1ie partition 148 defines a chamber 150 which, except for the passage 146, is in fluid tight isolation from the remainder of the reservoir interior. An outlet passage 152 leads from the reservoir 76 to the conduit 74 (FIG. 4). Initially the seal 130 is displaced downwards so that the handle 138 catches in a non-gastight manner, on the top of the wall 140. In this position the piston 134 is at A so that the passages 142 and 146 are open, the pistons 136 and 134 having been displaced therefrom. The hydraulic control 46 (or the control part 46a or 46c) is then pre-filled as described above After filling the control 46 (or the control part 46a or 46b) with hydraulic fluid, the sealing device 130 is pulled up manually to seal off the passages 142 and 146 as shown in FIG. 3. Now the interior of the reservoir 76 is completely sealed off from the external atmosphere. An abutment 153 may be provided on the spindle 132 to abut against the underside of wall 140 to prevent excessive lifting of the device 130. To prevent the sealing device 130 being inadvertently displaced, the handle 138 and upper end of the spindle 132 are then enclosed by a cup-shaped cover 154 which may be welded or otherwise adhered or connected in a fluidtight manner to the top of the reservoir. In its side wall the cover 154 has an air vent 156. When the pre-filled hydraulic control 46 is eventually installed in a motor vehicle and the vehicle ignition is then switched on, the electronic control 48 starts the pump 102 operating. This creates suction in the chamber 150 and the resultant pressure differential causes the sealing device 130 to be automatically displaced downwardly to open the passages 142 and 146.

In FIG. 3 it will be seen that piston 134 has a through passage 158 between its end faces. When the device 130 is providing its sealing function and the pre-filled hydraulic control 46 (or the control part 46a or 46c) is in store or being transported, an increase in temperature can cause thermal expansion of the fluid in conduit 74 (FIG. 4). This increase in fluid volume can escape from the chamber 150 through the passage 158 into the remainder of the reservoir 76.

In the embodiment in FIG. 5, the filler cap 100 snap-fits on the neck 126 and retains in a gastight manner a very supple flexible diaphragm 170 of an impermeable, elastic material, for example a rubber, which in this example is in the form of bag having a bellows or concertina shape. The top wall 144 of the reservoir 76 has a hole 172 therethrough. A cylindrical neck 174 united in a gastight manner with the wall 144, externally of the reservoir 76 surrounds the hole 172. A circular, flexible diaphragm 176 of elastic material, for example a rubber, is clamped in a gastight manner against the end of neck 174 by a cap 178 snap-fitted onto the neck. This cap has a hole 180 therethrough initially covered in a fluidtight manner by a manually removable seal arrangemenr 182, for example foil adhered to cap 178. Because the cap 100 is being used in conjunction with the bellows 170, the cap 100 in FIG. 5 has an air-vent 184 therethrough. It will also be seen from FIGS. 5 and 6 that the diaphragm 176 has a rectilinear slit 186 therethrough, the slit having effectively no width so that its opposite edges are always in a gastight sealing contact except when the pressure differential across the diaphragm 176 exceeds a pre-determined value sufficient to so distort the diaphragm that the edges of the slit 186 separate. Effectively the diaphragm 176 is a two-way valve.

The hydraulic control 46 in FIG. 5 may be pre-filled with hydraulic fluid using the neck 100 or 174 to give access to the reservoir interior and then replacing the cap 100 and bellows 170 or the cap 178 and diaphragm 176 accordingly, after filling. Alternatively a filling passage 188 may be provided, into which a fluid tight plug 190 is fitted after filling the control 46 with hydraulic fluid.

Once the pre-filled hydraulic control 46 is installed in a vehicle, the seal arrangement 182 is removed to uncover the hole 180.

A purpose of the arrangement of the diaphragms 170 and 176 in FIG. 5 is to try and restrict ingress of new moisture laden air into the reservoir 76, because water deteriorates the performance of hydraulic fluid. Under normal running conditions the pump 102 raises the hydraulic fluid pressure in the accumulator 106 from the predetermined minimum to the predetermined maximum and the volume of hydraulic fluid in the reservoir 76 decreases; whereas whilst the hydraulic pressure in the accumulator is falling towards the pre-determined minimum because the control valve 70 has been operated and fluid has been returned via conduit 78 to the reservoir, the volume of hydraulic fluid in the reservoir increases. The bag shaped diaphragm 170 embraces or defines sufficient internal volume that its volume can change to adequately compensate for the increase and decrease in the volume of fluid in the reservoir 76 during normal running. Furthermore the diaphragm 170 is so supple whereas the diaphragm 176 is sufficiently stiff that during the aforesaid normal running the change in the volume of fluid in the reservoir is accomodated by the diaphragm 170, and the diaphragm 176 is not distorted by any pressure gradient thereacross to an extent which would open the slit 186. Also whilst the seal 182 is still in position and the pre-filled control 46 is being stored or transported prior to use in a vehicle, changes in the ratio of the volume of air to the volume of fluid in the reservoir (due to thermal expansion or contraction of the fluid) can be accommodated by changes in the volume bounded by the diaphragm 170.

When the vehicle provided with the hydraulic control in FIG. 5 stands stationary for several hours, with the ignition turned off, hydraulic fluid from the accumulator 106 is progressively substantially completely discharged therefrom due to expansion of the gas chamber 112 (see FIG. 4). This discharged fluid makes its way to the reservoir 76 and considerably increases the volume of fluid in the reservoir. This so increases the air pressure in the reservoir 76 that the pressure gradient across the diaphragm 176 distorts it and opens the slit 186 to relieve the gas pressure. Should the vehicle ignition now be switched on, the pump 102 acts to considerably decrease the volume of fluid in the reservoir 76 whilst the fluid pressure in the accumulator 106 is being raised to the predetermined maximum value. This decrease in the volume of fluid decreases the gas pressure in the reservoir 76 so that the pressure gradient across diaphragm 176 can be sufficient to open the slit 186 to raise the gas pressure in the reservoir 76.

If desired the hydraulic control 46 in FIG. 3 may be provided with a two-way valve as described with reference to FIG. 5 and signified in FIG. 3 by the cap 178. In addition or as an alternative, the reservoir 76 in FIG. 3 may have a diaphragm 170 as disclosed in FIG. 5.

We claim:

1. A motor vehicle power hydraulic system, said system comprising: a reservoir of hydraulic fluid; and accumulator; a pump; a hydraulic actuator; a control valve having first, second and third inlet ports, the first inlet port connected by a first conduit means to the reservoir whereby hydraulic fluid may be supplied directly to the control valve and returned therefrom to the reservoir, the second inelt port being connected to the reservoir by a second conduit means including therein the accumulator for the storing therein of hydraulic fluid under pressure and supplying hydraulic fluid to the control valve and the pump which delivers hydraulic fluid from the reservoir to the accumulator and the control valve, and the third inlet port is connected to the hydraulic actuator by piping for conveying hydraulic fluid between the actuator and the third inlet port of the control valve; and a coupling having a first part connected to said third inlet port and a second part connected to said actuator the arrangement being such that when the first and second parts of the coupling are connected together they define a fluid path through said connected coupling parts which is opened so that the control valve can communicate with the actuator through the piping and the coupling, wherein the system is assembled and filled with hydraulic fluid which is retained within the system during at least one of subsequent transportation and storage prior to the filled system being mounted in the vehicle.

2. A power hydraulic system as claimed in claim 19, wherien each part of the coupling includes a coupling valve and when the first part and second parts of the coupling are connected together such connection opens the coupling valves so that the control valve can communicate with the actuator through the piping and the coupling.

3. A power hydraulic system as claimed in claim 1, further comprising breakable sealing in the coupling parts such that when the first part and the second part of the coupling are connected together the breakable sealing means become broken allowing establishment of a fluid path through the connected coupling parts so that the control valve can communicate with the actuator through the piping and the coupling.

4. A power hydraulic system as claimed in claim 11 comprising a first system part and a second system part, said first system part comprising the reservoir, the control valve, the conduit emans, the pump, the accumulator and the first coupling part connected to the third inlet port of the control valve, said second system part comprising the actuator connected to the second coupling part, the first system part being filled with hydraulic fluid which is retained within the first system part during at least one of subsequent transportation and storage prior to the filled first system part being mounted in the vehicle, the second system part being filled with hydraulic fluid which is retained within the second system part during at least one of subsequent transportation and storage prior to the filled second system part being mounted in the vehicle, and the first part undergoing at least one of filling and transporting and storage separately from the second system part in that the first and second system parts are not connected together by the coupling during at least one of said filling, transporting and storage.

5. A power hydraulic system as claimed in claim 1, further comprising a supple bag-shaped diaphragm disposed within the reservoir and defining an air volume bounded by said diaphragm which can vary in accordance with variation of the volume of hydraulic fluid in the reservoir.

6. A power hydraulic system as claimed in claim 1 wherein the hydrualic system is assembled together and then filled with hydraulic fluid prior to said assembled hydraulic system being transported for installation on a motor vehicle.

7. A power hydraulic system as claimed in claim 4, wherein the first system part is assembled together and is filled with hydraulic fluid, the second system part is assembled together and is filled with hydraulic fluid, the first and second system parts are transported for installation in a motor vehicle, and the complete power hydraulic system is assembled together on the motor vehicle by interconnection of the first and second parts of the coupling.

8. A motor vehicle power hydraulic system, said system comprising: a reservoir of hydraulic fluid; an accumulator; a pump; and a control valve having first, second and third inlet port, the first inlet port connected by a first conduit means to the reservoir whereby hydraulic fluid may be supplied directly to the control valve and returned therefrom to the reservoir, the second inlet port being connected to the reservoir by a second conduit means including therein the accumulator for the storing therein of hydraulic fluid under pressure and supplying hydrualic fluid to the control valve and the pump which delivers hydraulic fluid from the reservoir to the accumulator and the control valve, and the third inlet port connectable to a hydraulic actuator; wherein said system is assembled and filled with hydraulic fluid which is retained within the system during at least one of subsequent transportation and storage prior to the filled system being mounted in the vehicle, and the system further comprises passage means for communicating an interior of the reservoir with atmosphere and displaceable sealing means contained in said passage means and sealing off said passage means, said sealing means being automatically displaceable to open said passage means as a consequence of using said pump to pump fluid from the resevoir to said accumulator.

9. A motor vehicle power hydraulic system, said system comprising: a reservoir of hydrualic fluid; and accumulator; a pump; and a control valve having first second and third inlet ports, the first inlet port connected by a first conduit means to the reservoir whereby hydraulic fluid may be supplied directly to the control valve and returned therefrom to the reservoir by a second conduit means including therein the accumulator for the storing therein of hydraulic fluid under pressure and supplying hydraulic fluid to the control valve and the pump which delivers hydraulic fluid from the reservoir to the accumulator and the control valve, and the third inlet port connectable to a hydraulic actuator; wherein said system is assembled and filled with hydraulic fluid which is retained within the system during at least one of subsequent transportation and storage prior to the filled system being mounted in the vehicle, and the system further comprises passage means leading from the interior of the reservoir to atmosphere, and a two-way valve for selaing said passage means and which automatically opens when the gas pressure difference between the pressure of the atmopshere and the gas pressure in the reservoir exceeds a predetermined value, a passage leading to said two-way valve, and temporary sealing means to isolate the two-way valve from the atmosphere during at least one of transportation and storage of said system and said sealing means be dislodgeable to allow exposure of the two-way valve to the atmosphere.

* * * * *

UNITED STATES PATENT AND TRADEMARK OFFICE
CERTIFICATE OF CORRECTION

PATENT NO.  :  5,188,204
DATED       :  February 23, 1993
INVENTOR(S) :  David Robert ARROWSMITH, David PARSONS & Alastair J. YOUNG It is certified that error appears in the above-identified patent and that said Letters Patent is hereby corrected as shown below:

Title page: [Item 21]    should read --573,148--.

Column 9, line 16 replace "inelt" with --inlet--;
          line 33 replace "the" with --said--;
          line 38 replace "19" with --1--;
          line 53 replace "11" with --1--;
          line 56 replace "emans" with --means--.

Column 11, line 5 replace "selaing" with --sealing--.

Signed and Sealed this

Sixteenth Day of November, 1993

Attest:

BRUCE LEHMAN

*Attesting Officer*      *Commissioner of Patents and Trademarks*